May 6, 1941.  H. O. DROTNING  2,241,122
LOCKING DEVICE FOR FILM WINDING MECHANISM
Filed June 9, 1939
FIG. 1.
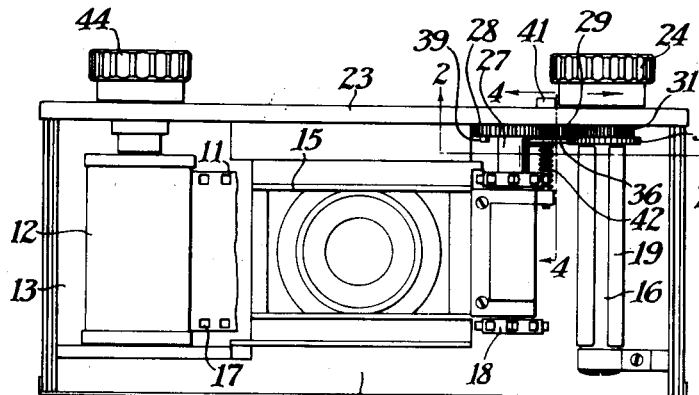
FIG. 2.
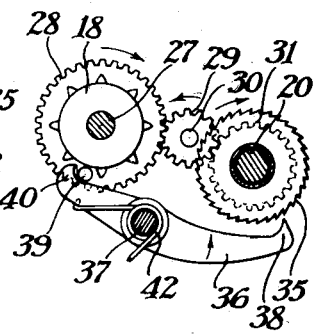
FIG. 4. FIG. 5.
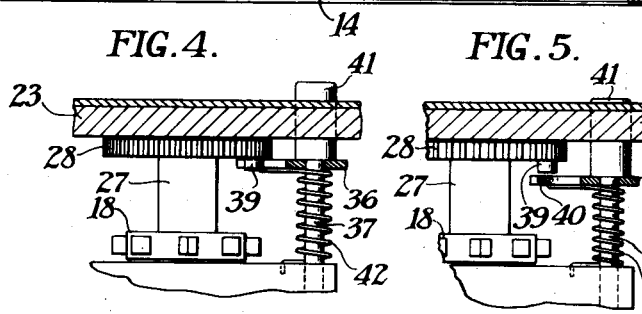
FIG. 3.
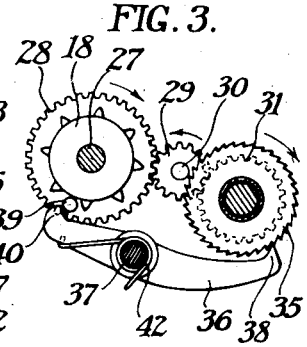
FIG. 6. FIG. 7.
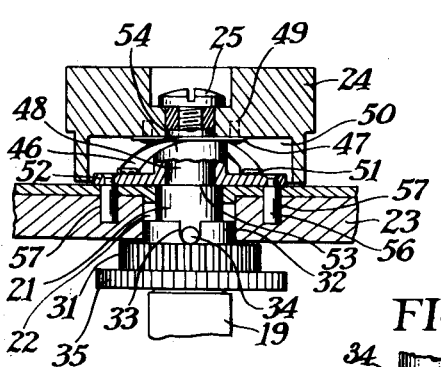
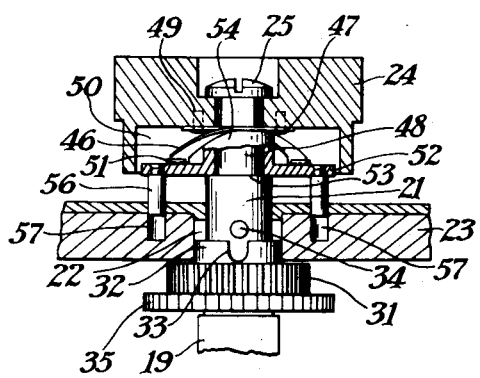
FIG. 8.
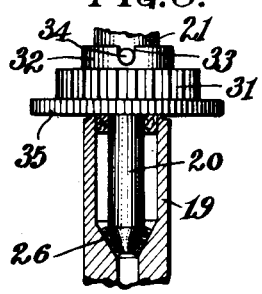
HENRY O. DROTNING
INVENTOR
BY
ATTORNEYS Patented May 6, 1941

2,241,122

UNITED STATES PATENT OFFICE 2,241,122

LOCKING DEVICE FOR FILM WINDING MECHANISM

Henry O. Drotning, Rochester, N. Y., assignor to Eastman Kodak Company, Rochester, N. Y., a corporation of New Jersey Application June 9, 1939, Serial No. 278,307

11 Claims. (Cl. 242—71)

The present invention relates to photography, and more particularly to roll film cameras of the type in which the film strip is unwound from a supply retort positioned at one end of the camera, and is subsequently rewound thereinto after the entire strip, or any desired portion thereof, has been exposed. The retort, with its exposed film, may then be removed from the camera for developing.

One object of the invention is the provision of an arrangement by which the winding knob for the takeup spool or shaft is positively locked against backward or reverse rotation.

Another object of the invention is the provision of a locking means of this class which is movable as a unit with an axially movable winding knob to always lock the latter against reverse rotation regardless of the position thereof.

Still another object of the invention is the provision of an arrangement by which end thrust on the wind-up shaft is effectively eliminated.

Yet another object of the invention is the provision of an arrangement for connecting a film feeding member to the windup shaft so that the member is positively driven to feed the film upon rotation of the wind-up knob. After the film strip has been exposed, the feeding member is then disconnected from the wind-up shaft so that the exposed film strip may be rewound into the film retort.

To these and other ends, the invention resides in certain improvements and combinations of parts all as will be hereinafter more fully described, the novel features being pointed out in the claims at the end of the specification.

In the drawing:

Fig. 1 is a plan view of a roll film camera of the class described with the back removed, showing the relation thereto of the film supply retort and the film feeding and measuring mechanisms;

Fig. 2 is an enlarged detailed view of the film feeding and measuring mechanisms, taken substantially on line 2—2 of Fig. 1, showing the relation of the various parts just prior to the locking of the wind-up shaft;

Fig. 3 is a view similar to Fig. 2, but showing the parts at the end of a cycle of operation at which time the film wind-up shaft is locked to prevent further feeding of the film strip.

Fig. 4 is an enlarged view of a portion of the mechanism illustrated in Fig. 1, and taken substantially in line 4—4 thereof with parts in section and parts in elevation, showing the film feeding sprocket and the relation thereto of the pivoted lever for arresting the rotation of the wind-up shaft after the proper amount of film has been wound thereonto;

Fig. 5 is a view similar to Fig. 4, but showing the pivoted lever moved to a position to unlock the wind-up shaft to permit the film to be again moved through the camera;

Fig. 6 is a sectional view through one end of the wind-up shaft, with parts in section and parts in elevation, showing the novel form of pawl and ratchet for locking the wind-up knob against rotation in a reverse or non-film winding direction, and a clutch for connecting the winding knob and shaft to the film feeding sprocket;

Fig. 7 is a view similar to Fig. 6, but with the parts moved to a position to disengage the clutch; and Fig. 8 is a longitudinal section through the wind-up shaft showing the slip clutch arrangement by which the two shaft members may be operatively connected.

Similar reference numerals throughout the various views indicate the same parts.

The present invention is embodied, in the present instance, in a camera of the so-called miniature type in which the film supply is in the form of a perforated film strip 11 which is wound into a roll in a supply retort 12 positioned in a chamber 13 formed at one end of the camera body 14. The film strip passes over an exposure frame 15 and is secured to a wind-up or takeup shaft, broadly designated by the numeral 16. The marginal film perforations 17 are engaged by a feed sprocket 18 which is driven, in a manner to be later described, to feed the film strip from the supply retort to the wind-up shaft.

The windup shaft comprises an outer cylindrical member 19 to which the end of the film strip is secured, and an inner cylindrical member 20. These members are disengageably connected in any suitable manner such, for example, by means of a cone clutch broadly designated by the numeral 26, as clearly shown in Fig. 8. As such cone clutches are of standard and well known construction, a detailed description thereof is not deemed necessary to those in the art or to a full understanding of the present invention. Suffice it to say that the two shaft members rotate as a unit during the film winding operation. The inner shaft member is formed with a portion 21 which extends through an opening 22 in the camera wall 23 of the camera body, as shown in Figs. 6 and 7. The winding knob 24 is secured by a screw 25 to the end of the portion 21 to rotate the latter and the outer portion 19 to wind the film strip 11 thereon.

The film strip is wound up on the takeup shaft by rotating the winding knob 24 in the direction indicated by the arrow, Fig. 1. This rotation of the wind-up shaft is utilized to drive the film feed sprocket 18 which, in turn, controls a film measuring mechanism which automatically locks the takeup shaft against further rotation after the film strip has been moved a distance of one image area, as will be later pointed out. To secure this result, the sprocket shaft 27 has mounted thereon a gear 28 which meshes with an idler gear 29 supported on a stub-shaft 30 carried by the camera wall 23, see Figs. 1 to 5. This idler gear, in turn, engages a gear 31 loosely mounted on the inner member 20 of the wind-up shaft 16, just inside the camera wall 23, as best shown in Figs. 6 and 7. This loosely mounted gear is formed with an axially extending collar or sleeve 32 having an open end slot 33 arranged to receive a pin 34 on the portion 21 of the inner shaft member, as shown in Figs. 6 and 7. This pin and slot provide a clutch between the wind-up shaft and the gear 31 whereby the latter is rotated upon rotation of the wind-up knob 24. The rotation of the gear 31 serves to positively drive the feed sprocket 18 to move or feed the film strip through the camera, as is apparent from inspection of Figs. 2 and 3. Thus the rotation of the knob 24 not only winds the film on the takeup shaft, but also feeds the film through the camera.

The feed sprocket 18 is made of such a diameter that one revolution thereof will move one exposure or image area of film across the exposure frame 15. At the end of this movement, the wind-up shaft and the winding knob are locked to arrest further movement of the film. This locking means comprises a ratchet 35 which is secured to or formed integral with the gear 31 and which lies in the path of a pawl 36 pivotally mounted on a shaft or stud 37. The pawl 36 has one end thereof formed to provide a hook-like member 38 which, when the pawl is rotated in the direction of the arrow, Fig. 2, engages the ratchet 35, see Fig. 3, to lock the gear 31 and hence the wind-up shaft and the feed sprocket, as will be apparent from an inspection of the drawing.

In order that this locking of the wind-up shaft will occur in proper timed relation with the film movement, the operation of the pawl 36 is controlled by the feed sprocket 18. To this end, the gear 28 on the sprocket shaft is formed with a laterally extending pin 39 which, when the sprocket has made one revolution, engages a lug 40 formed on the other end of the pawl 36. Fig. 2 shows the pin 39 just engaging the lug 40. Upon further rotation of the sprocket 18 and its gear 28, the pin 39 will pivot the pawl about the shaft 37 to bring the hook portion 38 into locking engagement with the ratchet 35. Thus upon each revolution of the feeding sprocket 18, the wind-up shaft is locked, and as each such revolution moves one image area, the locking of the wind-up shaft occurs when a new and unexposed portion of the film strip has been positioned over the image frame 15. After the wind-up shaft has been thus locked, the film strip is now in position to make an exposure.

In order to now release the wind-up shaft so that the exposed film may be wound thereon, a push button 41 is provided. This button is spring pressed outwardly by a coil spring 42 which is wrapped around the shaft 37 and anchored as shown in Figs. 1, 4 and 5. When the button 41 is pressed inwardly, as shown in Fig. 5, the lug 40 is moved out of engagement with the pin 39 to free the pawl 36, the latter now moving in a clockwise direction under the action of the spring 42 to move the hook 38 out of engagement with the ratchet 35. As the winding mechanism is now free, the knob 24 may be rotated to wind up the exposed film, and when a new image area has been again moved to exposing position, the feeding mechanism is again locked, as above described. Thus at the end of each winding operation the winding shaft is locked against further rotation, this locking being controlled from the sprocket 18, through the pivoted pawl 36. The sprocket 18 may, therefore, be considered as part of a film measuring mechanism which accurately measures off a length of film each time the sprocket is rotated.

After the entire roll, or any desired portion thereof, has been exposed, and it is desired to rewind the film strip back into the supply retort 12, it is only necessary to grasp the winding knob 24 and move the latter axially to the position shown in Fig. 7. As the winding knob is secured to the inner shaft member 20, the latter is moved as a unit with the winding knob to disengage the pin 34 from the slot 33 of the gear 31 and to also disengage the cone clutch 26, as will be apparent from an inspection of Fig. 3. This disengagement frees the sprocket 18 and the outer member 19 of the wind-up shaft. A knob 44 may now be rotated to rewind the exposed film back into the supply retort. During this rewinding operation, the inner shaft member 20 remains stationary while the outer member 19 rotates relative to the inner member as the film is unwound therefrom.

The winding knob 24 is preferably arranged so that it may turn only in the direction of the arrow, Fig. 1, both during the film winding and rewinding operation. Any attempt to turn the knob in the opposite or reverse direction will immediately bring into play a locking device to effectively lock the winding knob 24 against such reverse rotation. This locking is accomplished, in the present embodiment, by providing a spring member or pawl 46 which is carried by a washer 47 mounted on reduced end portion 48 of the inner shaft member 20, see Figs. 6 and 7. The washer is shown as secured to the under side of the knob 24 by screws or rivets 49 in position in a recess 50 formed in the lower portion of the knob. These spring pawls 46 are arranged to engage teeth 51 of a ratchet 52 which is loosely mounted on the reduced shaft portion 48 and supported by a shoulder 53 formed between portion 48 and the inner shaft member 20, see Figs. 6 and 7. By means of this arrangement, the ratchet 52, as well as the pawl 46, is mounted on and supported by the inner shaft member 20, the purpose of which arrangement will be later pointed out.

The ratchet 52 is formed with a short sleeve portion 54 which loosely engages the portion 48 to afford sufficient bearing surface for the ratchet. This sleeve portion preferably extends upwardly and into engagement with the washer 47 to retain the pawl and ratchet in proper spaced relation and to maintain the ratchet on the supporting shoulder 53. Of course the sleeve 54 may be made smaller and a separate spacer may be inserted between the portion 54 and the washer 47. The teeth 51 of the ratchet 52 are so arranged that when the winding knob 24 is rotated in the direction of the arrow, see Fig. 1, to wind the film, the pawl 46 freely slides over the teeth 51. However, any attempt to rotate the knob 24 in the reverse direction will immediately bring the pawls 46 into locking engagement with the teeth 51 to effectively prevent such rotation. The ratchet 52 is held stationary by means of pins 56 which are secured to and depend from the ratchet, and extend into registering holes 57 formed in the camera wall 23, see Figs. 6 and 7.

By means of this arrangement the pawl 46 rotates with the winding knob while the ratchet 52 is held in non-rotating position. This pawl and ratchet arrangement 46 and 52 is, however, movable axially as a unit with the winding knob 24 when the latter is moved from the normal film-winding position, shown in Fig. 6, to the film rewinding position shown in Fig. 7. It will be noted that even in this latter position the pawl and ratchet are still in positive engagement so as to prevent reverse rotation of the winding knob 24. This unitary movement of the pawl and ratchet mechanism is accomplished by reason of the fact that the pawl is secured to the winding knob 24 and the ratchet 52 is supported on the shoulder 53 of the movable shaft member. Such an arrangement will always maintain the pawl and ratchet in locking engagement regardless of the axial position of the knob 24 so as to prevent improper rotation of the latter. By having the pawl and ratchet movable axially, it is possible to disengage the clutch pin 34 from the slot 33 to allow the film to be rewound without turning the winding knob 24 backwards. In addition, the film on the windup spool can never become uncoiled whether the knob is in or out so that there is no necessity for friction bearings, thus enabling running fits to be used in all bearings to give greater smoothness of operation and to permit easy winding.

In prior cameras of this type in which a pawl and ratchet were used to prevent reverse rotation of the windup knob, the ratchet was mounted on the camera body. In such an arrangement, the spring pawl, acting on the ratchet, produced an end thrust on the winding knob and tended to move the latter axially so as to disengage the pawl from the ratchet. The present invention eliminates such end thrust by mounting both the pawl and the ratchet directly on the axially movable member of the windup shaft so that the film may be wound without any possibility of the knob becoming disengaged. The elimination of this end thrust is a highly desirable feature, as will be apparent to those skilled in the art.

It is apparent from the above description that the present invention provides an arrangement for locking the winding knob against reverse rotation. As this locking mechanism is movable axially with the knob, it will be effective when the latter is in either film winding or the film rewinding position. In addition, the locking mechanism is so mounted as to effectively and positively eliminate end thrust on the wind-up shaft to prevent accidental disengagement thereof during the film winding.

While one embodiment of the invention has been disclosed, it is to be understood that inventive idea may be carried out in a number of ways. This application is, therefore, not to be limited to the precise details described, but is intended to cover all variations and modifications thereof falling within the spirit of the invention or the scope of the appended claims.

I claim:

1. In a film winding mechanism for a camera, the combination with a winding shaft rotatably mounted in one end of said camera, of a winding knob secured to said shaft to rotate the latter in one direction to wind a film strip thereon, film measuring means comprising a member rotatably mounted in said camera and arranged to engage said strip to feed the latter through said camera, a gear loosely mounted on said shaft, a clutch for connecting said gear to said shaft, means for operatively connecting said gear to said member so that the latter will be driven upon rotation of said shaft by said knob, said knob being movable axially to disengage said clutch to disconnect said member from said shaft, and means mounted on said shaft and movable as a unit with said knob for locking said shaft against rotation in the opposite direction.

2. In a film winding mechanism for a camera, the combination with a film winding shaft rotatably mounted in one end of said camera, of an axially movable portion of said shaft projecting through a wall of said camera, a winding knob mounted on said portion for rotating said shaft in one direction to wind a film strip thereon, a film feeding member rotatably mounted in said camera and arranged to engage said film strip to feed the latter through said camera to said shaft, a gear loosely mounted on said shaft, means connecting said gear to said member so that the latter will be positively driven when said shaft is rotated in said one direction so as to feed said film through said camera, said portion being movable axially to uncouple said gear from said shaft to disconnect said member therefrom to permit said film to be rewound into a retort positioned at the other end of said camera, and means for locking said winding knob against reverse rotation.

3. A film winding mechanism for a camera comprising a wind-up assemblage consisting of a unitary axially-movable shaft and knob positioned in one end of said camera for sliding movement therein, said assemblage being rotatable in one direction to wind-up a film strip, locking means comprising a pawl and ratchet carried by and movable axially as a unit with said assemblage, and means on said assemblage for maintaining said ratchet in fixed spaced relation with said knob.

4. A film winding mechanism for a camera comprising a wind-up assemblage consisting of a unitary axially-movable shaft and knob positioned in one end of said camera for sliding movement therein, said assemblage being rotatable in one direction to wind-up a film strip, a ratchet loosely mounted on said assemblage but movable axially therewith, a pawl fixed to said assemblage and positioned between said knob and ratchet and engaging the latter, and cooperating means on said assemblage and said ratchet for maintaining said knob in fixed spaced relation with said ratchet to retain said pawl in engagement with said ratchet.

5. A film winding mechanism for a camera comprising a wind-up assemblage consisting of a unitary axially-movable shaft and knob positioned in one end of said camera for sliding movement therein, said assemblage being rotatable in one direction to wind-up a film strip, a ratchet loosely mounted on said assemblage but movable axially therewith, a pawl fixed to said assemblage and positioned between said knob and ratchet and engaging the latter, cooperating members on said camera and said ratchet to prevent rotation of the latter when said assemblage is rotated to wind said film strip, and means on said assemblage for maintaining said ratchet and knob in fixed spaced relation.

6. A film winding mechanism for a camera comprising a wind-up assemblage consisting of a unitary axially-movable shaft and knob positioned in one end of said camera for sliding movement therein, said assemblage being rotatable in one direction to wind-up a film strip, a ratchet loosely mounted on said assemblage but movable axially therewith, a pawl fixed to said assemblage and positioned between said knob and ratchet and engaging the latter, depending pins on said ratchet positioned to extend into registering openings in said camera so as to prevent rotation of said ratchet when said assemblage is rotated to wind said film strip but permitting free axial movement of said ratchet with said assemblage, and means on said assemblage for maintaining said ratchet in fixed spaced relation with said knob.

7. A film winding mechanism for a camera comprising a wind-up assemblage consisting of a unitary axially-movable shaft and knob positioned in one end of said camera for sliding movement therein, said assemblage being rotatable in one direction to wind-up a film strip, film measuring means comprising a member rotatably mounted in said camera and arranged to engage said strip to feed the latter through said camera, means for driving said member from said assemblage, means for releasably connecting said driving means to said assemblage, means comprising a pawl and ratchet carried by said assemblage and movable axially as a unit therewith for locking said assemblage against rotation in the opposite direction, and means on said assemblage for maintaining said ratchet in fixed spaced relation with said knob.

8. A film winding mechanism for a camera comprising a wind-up assemblage consisting of a unitary axially-movable shaft and knob positioned in one end of said camera for sliding movement therein, said assemblage being rotatable in one direction to wind-up a film strip, film measuring means comprising a member rotatably mounted in said camera and arranged to engage said strip to feed the latter through said camera, a gear loosely mounted on said assemblage, a clutch for connecting said gear to said assemblage, means for operatively connecting said gear to said member so that the latter will be driven upon rotation of said assemblage, said knob and shaft being movable axially as a unit to disengage said clutch to disconnect said member from said assemblage, pawl and ratchet means mounted on and movable axially with said assemblage and adapted to lock the latter against rotation in the opposite direction, and cooperating means on said locking means and said assemblage to maintain said knob and ratchet in fixed spaced relation.

9. In a film winding mechanism for a camera, the combination with a film winding shaft rotatably mounted in one end of said camera and having an axially movable portion projecting through and extending exteriorly of a wall of said camera, of a winding knob secured to said portion for rotating said shaft in one direction to wind a film strip thereon, film measuring means comprising a film feeding member rotatably mounted in said camera adjacent said shaft and arranged to engage said film to feed the latter through said camera toward said shaft, a drive gear loosely mounted on said portion, a clutch for connecting said gear to said portion, driving members connecting said gear to said member so that the latter will be positively driven upon rotation of said portion to feed the film through said camera, said portion being movable axially to declutch said portion from said gear to disconnect said member to permit said strip to be rewound into a retort at the opposite end of said camera, a ratchet loosely mounted on said portion in spaced relation with said knob and axially movable as a unit with said knob and portion, a pawl secured to said portion and positioned between said knob and ratchet so as to engage the latter to prevent rotation of said knob and portion in a reverse direction, and means for supporting said ratchet on said portion and cooperating with said pawl and ratchet to maintain the ratchet and knob in fixed spaced relation to prevent inadvertent disengagement of said pawl and ratchet.

10. In a film winding mechanism for a camera, the combination with a film winding shaft rotatably mounted in one end of said camera and having an axially movable portion projecting through and extending exteriorly of a wall of said camera, of a winding knob secured to said portion for rotating said shaft in one direction to wind a film strip thereon, film measuring means comprising a film feeding member rotatably mounted in said camera adjacent said shaft and arranged to engage said film to feed the latter through said camera toward said shaft, a drive gear loosely mounted on said portion, a clutch for connecting said gear to said portion, driving members connecting said gear to said member so that the latter will be positively driven upon rotation of said portion to feed the film through said camera, said portion being movable axially to declutch said portion from said gear to disconnect said member to permit said strip to be rewound into a retort at the opposite end of said camera, a ratchet loosely mounted on said portion in spaced relation with said knob and axially movable as a unit with said knob and portion, a pawl secured to said portion and positioned between said knob and ratchet so as to engage the latter to prevent rotation of said knob and portion in a reverse direction, means for supporting said ratchet on said portion and cooperating with said pawl and ratchet to maintain the ratchet and knob in fixed spaced relation to prevent inadvertent disengagement of said pawl and ratchet, and depending pins on said ratchet extending into registering holes in said camera to prevent rotation of said ratchet when said knob and portion are rotated in film winding direction.

11. In a film winding mechanism for a camera, the combination with a film winding shaft rotatably mounted in one end of said camera and having an axially movable portion projecting through and extending exteriorly of a wall of said camera, of a winding knob secured to said portion for rotating said shaft in one direction to wind a film strip thereon, film measuring means comprising a film feeding member rotatably mounted in said camera adjacent said shaft and arranged to engage said film to feed the latter through said camera toward said shaft, a drive gear loosely mounted on said portion, a clutch for connecting said gear to said portion, driving members connecting said gear to said member so that the latter will be positively driven upon rotation of said portion to feed the film through said camera, said portion being movable axially to declutch said portion from said gear to disconnect said member to permit said strip to be rewound into a retort at the opposite end of said camera, a ratchet loosely mounted on said portion in spaced relation with said knob and axially movable as a unit with said knob and portion, a pawl secured to said portion and positioned between said knob and ratchet so as to engage the latter to prevent rotation of said knob and portion in a reverse direction, depending pins on said ratchet arranged to extend into aligned openings in said camera to retain said ratchet against rotation, and a shoulder on said portion for supporting said ratchet thereon, said shoulder cooperating with said pawl and ratchet to maintain a fixed spaced relation between said knob and ratchet.

HENRY O. DROTNING.